United States Patent
Jost et al.

(10) Patent No.: US 10,511,434 B2
(45) Date of Patent: Dec. 17, 2019

(54) METHOD AND ENCRYPTION NODE FOR ENCRYPTING MESSAGE

(71) Applicant: Telefonaktiebolaget LM Ericsson (publ), Stockholm (SE)

(72) Inventors: Christine Jost, Lund (SE); Ha Lam, Forest Hills, NY (US); Alexander Maximov, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 79 days.

(21) Appl. No.: 15/578,597

(22) PCT Filed: Jun. 2, 2015

(86) PCT No.: PCT/SE2015/050637
§ 371 (c)(1),
(2) Date: Nov. 30, 2017

(87) PCT Pub. No.: WO2016/195551
PCT Pub. Date: Dec. 8, 2016

(65) Prior Publication Data
US 2018/0159680 A1   Jun. 7, 2018

(51) Int. Cl.
*H04L 9/00* (2006.01)
*H04L 9/30* (2006.01)
(Continued)

(52) U.S. Cl.
CPC ............ *H04L 9/008* (2013.01); *H04L 9/0618* (2013.01); *H04L 9/08* (2013.01); *H04L 9/30* (2013.01);
(Continued)

(58) Field of Classification Search
CPC .................... H04L 63/0471; H04L 63/00
See application file for complete search history.

(56) References Cited

U.S. PATENT DOCUMENTS

| 6,091,819 A | 7/2000 | Venkatesan et al. |
| 2005/0216754 A1* | 9/2005 | Ehud .................... G06F 21/6209 713/193 |
| 2006/0294362 A1* | 12/2006 | Epstein ................. H04L 63/061 713/153 |

FOREIGN PATENT DOCUMENTS

WO    98/07253 A1    2/1998

OTHER PUBLICATIONS

Extended European Search Report dated Mar. 29, 2018, issued for European patent application No. 15894389.4, 8 pages.
(Continued)

*Primary Examiner* — William J. Goodchild
(74) *Attorney, Agent, or Firm* — Rothwell, Figg, Ernst & Manbeck, P.C.

(57) ABSTRACT

A method and encryption node (300) for providing encryption of a message m according to a selected encryption scheme. A set of k noise factors are pre-compiled (3:1) from random numbers and predefined integer parameters of the selected encryption scheme by the encryption node (300) in advance. The k noise factors are saved (300a) to be used for encrypting the message m when later requested (3:2) by a client (302). A subset of noise factors are then selected (3:3) out of the pre-computed set of k noise factors and used as input to the encryption scheme when encrypting (3:5) the message m by computing a cipher text c which is delivered (3:6) as an encrypted message, e.g. to the client (302). Thereby, less time needs to be spent for computing the necessary noise factors after receiving the encryption request and higher throughput can thus be achieved for messages to be encrypted. In particular, the solution may be used to increase the throughput for a stream of messages.

21 Claims, 3 Drawing Sheets

(51) Int. Cl.
*H04L 29/06* (2006.01)
*H04L 9/06* (2006.01)
*H04L 9/08* (2006.01)

(52) U.S. Cl.
CPC .......... *H04L 9/304* (2013.01); *H04L 63/0471* (2013.01)

(56) References Cited

OTHER PUBLICATIONS

Boyko, V. et al., "Speeding up Discrete Log and Factoring Based Schemes via Precomputations" ECCV 2016 conference, 1998, Springer, vol. 1403, pp. 221-235.
International Search Report and Written Opinion issued in International Application No. PCT/SE2015/050637, dated Feb. 2, 2016, 12 pages.
Paillier, P., "Public-Key Cryptosystems Based on Composite Degree Residuosity Classes", Advances in Cryptology—Eurocrypt '99, International Conference on the Theory and Application of Cryptographic Techniques, 1999, 15 pages.
Boyko, V., "A Pre-Computation Scheme for Speeding Up Public-Key Cryptosystems", Master's thesis, Massachusetts Institute of Technology, 1998, 40 pages.

\* cited by examiner

METHOD AND ENCRYPTION NODE FOR ENCRYPTING MESSAGE

CROSS REFERENCE TO RELATED APPLICATION(S)

This application is a 35 U.S.C. § 371 National Stage of International Patent Application No. PCT/SE2015/050637, filed Jun. 2, 2015, designating the United States, the disclosure of which is incorporated by reference.

TECHNICAL FIELD

The present disclosure relates generally to a method and an encryption node for providing encryption of a message.

BACKGROUND

In the field of data processing and analytics, clients such as different companies, enterprises, organizations and authorities have a need for hardware and software resources in order to perform various data processing operations, e.g. when various recorded information relating to users is analyzed in order to extract knowledge and statistics therefrom. The processing involved in such data analytics may be quite complex and computationally intensive requiring considerable capacity for executing the processing of data.

Traditionally, the clients themselves may own and maintain all the resources they need for data processing which can be quite costly and time-consuming, though. For example, considerable knowledge and skills are typically required first to find out what type of resources is needed, and then to acquire and install those resources. The client thus often needs to employ skilled staff and/or hire consultants to enable efficient deployment of resources. Furthermore, as the technique is developing and progressing rapidly in the field of computers and software, purchased or hired resources tend to become out-of-date very quickly and must frequently be replaced by new resources with better functionality, which is naturally also costly and time-consuming.

Another problem is that a client may need a great amount of resources for a very limited period to make some large computational operation once or just a few times a year, e.g. related to economics, statistics or stock inventory, while very little resources are used during the remainder time. The client thus has to make investments in resources enough to cope with such peak usage and also when demands and operation change over time.

In recent years, it has become possible for clients to hire and utilize resources for data processing, e.g. residing in large data centers comprising a great range of processors, computers and data storages, commonly referred to as cloud computing or simply "the cloud", which can thus be shared by many clients. Effectively, all the needed resources may be available from such a data center and the clients do not have to make their own investments but can instead outsource the processing and analytics to resources in the cloud, or similar.

Sometimes the data to be processed may contain elements that are somehow sensitive to exposure, or in terms of privacy and/or integrity, meaning that it is desirable to protect the data from exposure to any unauthorized party. It may therefore be deemed unsafe to send the data unprotected to any environment where privacy and integrity may be in jeopardy such as shared resources in the cloud. In this context it can thus be assumed that the cloud, or similar shared environments, is deemed untrusted. A solution to this problem is to encrypt the data before sending it to the cloud, or similar. However, many common encryption methods of today have the disadvantage that the encrypted data must be decrypted before any computation or analysis can be made on the data. By using so-called homomorphic encryption methods, certain computations can actually be made on the encrypted data without having to first decrypt the data.

Such encryption may be achieved by using a so-called Fully Homomorphic Encryption, FHE, scheme, although currently known FHE schemes are relatively complex and rather slow in execution. Hence, it may sometimes be more attractive in practice to implement a Partially Homomorphic Encryption, PHE, scheme, which has a better performance in terms of complexity and time.

Addition is one of some basic computational operations that are needed in many use cases. The so-called Paillier cryptosystem is known in this field and it is an additive PHE scheme that can be used for performing addition operations on encrypted data without decrypting the data. In this disclosure, the term "message" will be used to represent a set of data to be encrypted before further processing and analysis. A message in this context thus comprises a numeric value that can be used for addition calculations.

In more detail, the PHE scheme of Paillier satisfies $$\mathrm{Enc}(m_1+m_2)=\mathrm{Enc}(m_1)\cdot\mathrm{Enc}(m_2)$$

where $m_1$ and $m_2$ are two different sets of data or messages in plaintext while "Enc" is an encryption function to obtain a cipher text. The property above makes it possible to compute an encryption of the sum of plaintexts $m_1+m_2$ by multiplying the corresponding cipher texts $\mathrm{Enc}(m_1)$ and $\mathrm{Enc}(m_2)$ in accordance with the above expression. This property can be used in turn to perform computations on encrypted data without first decrypting the data.

The Paillier cryptosystem is described in more detail in the article "Public-Key Cryptosystems Based on Composite Degree Residuosity Classes", Pascal Paillier, published in J. Stern, Ed., Advances in Cryptology—EUROCRYPT '99, vol. 1592 of Lecture Notes in Computer Science, pp. 223-238, Springer-Verlag, 1999. The Paillier cryptosystem has different variants, and a variant denoted "Scheme 3" is able to provide the above-described property.

Figure 1:
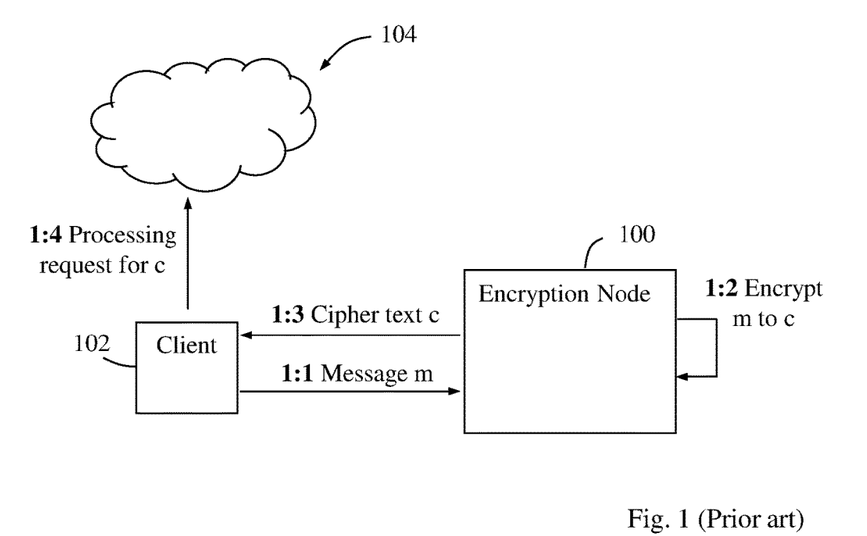
FIG. 1 is a communication scenario illustrating how a client obtains encryption of a message to be processed in a cloud of processing resources, according to the prior art.

It is thus desirable to encrypt any sensitive messages before processing in a cloud environment or the like while keeping the data in encrypted form by using homomorphic encryption such as the above Paillier cryptosystem. Such encryption of messages using the Paillier cryptosystem, is typically a quite complex operation requiring intensive computation and a specialized encryption node is often employed to perform the encryption operation on behalf of a client. FIG. 1 illustrates schematically that an encryption node 100 receives a request for encryption of a message m from a client 102, in an action 1:1. In response thereto, the encryption node 100 performs encryption of the message by converting or translating the message m into a cipher text c, in another action 1:2 using homomorphic encryption such as the above-described Paillier cryptosystem.

The encryption node 100 then returns the cipher text c as the message m in encrypted form to the client 102, in an action 1:3, while a final action 1:4 illustrates that the client 102 sends a request to a "cloud" 104 of processing resources, for processing the message in the encrypted form, i.e. the cipher text c. As described above, it is possible to perform certain processing operations on cipher texts encrypted with a homomorphic encryption scheme. For example, it is possible to perform additions on the messages by performing multiplications on the corresponding cipher texts when said cipher texts are encrypted according to the Paillier cryptosystem.

However, it is a problem that the encryption operation using the above-mentioned Paillier cryptosystem involves quite complex and time-consuming computations and it may not be possible to employ it in cases requiring a high data throughput to enable certain analytic operations. For example, it may be necessary to encrypt a stream of incoming data with a high throughput. As an example of a use case scenario in big data analytics, it may happen that data sets, or messages, are issued from multiple sources with a high speed, and that they should be encrypted and sent to a third party's data resources for further analysis, e.g. in untrusted cloud services and databases. In this case the Paillier cryptosystem may not be able to encrypt the stream of incoming data with sufficiently high throughput so that it becomes a bottleneck for applications with demands for high data throughput.

SUMMARY

It is an object of embodiments described herein to address at least some of the problems and issues outlined above. It is possible to achieve this object and others by using a method and an encryption node as defined in the attached independent claims.

According to one aspect, a method is performed by an encryption node of a communication system for providing encryption of a message m according to a selected encryption scheme. In this method the encryption node pre-computes a set of k noise factors $\{s_1, \ldots, s_k\}$ as $$s_1 = h^{r_1} \bmod N, \ldots, s_k = h^{r_k} \bmod N$$

where k and N are predefined integer parameters of the selected encryption scheme and $r_1, \ldots, r_k$ are random numbers.

When receiving a request from a client for encryption of the message m, the encryption node selects a subset of l noise factors $s_{a_1}, \ldots, s_{a_l}$ out of the pre-computed set of k noise factors, and computes $h^R \bmod N$ for a random value R as the product of the selected subset of l noise factors modulo N where R is the sum $r_{a_1} + \ldots + r_{a_l}$ of the random numbers $r_{a_1}, \ldots, r_{a_l}$ in the subset of l noise factors, such that $$s_{a_1} \cdot \ldots \cdot s_{a_l} \equiv h^{r_{a_1}} \cdot \ldots \cdot h^{r_{a_l}} \equiv h^{r_{a_1} + \ldots + r_{a_l}} \equiv h^R \bmod N.$$

The encryption node then encrypts the message m by computing a cipher text c as $$c = g^m \cdot h^R \bmod N$$

where g is a predefined integer parameter of the selected encryption scheme, and delivers the cipher text c as an encrypted message.

According to another aspect, an encryption node is arranged to provide encryption of a message m in a communication system according to a selected encryption scheme. The encryption node comprises a processor and a memory containing instructions executable by the processor whereby the encryption node is configured to:

pre-compute a set of k noise factors $\{s_1, \ldots, s_k\}$ as $$s_1 = h^{r_1} \bmod N, \ldots, s_k = h^{r_k} \bmod N,$$

where h and N are predefined integer parameters of the selected encryption scheme and $r_1, \ldots, r_k$ are random numbers, receive a request from a client for encryption of the message m, select a subset of l noise factors $s_{a_1}, \ldots, s_{a_l}$ out of the pre-computed set of k noise factors, compute $h^R \bmod N$ for a random value R as the product of the selected subset of l noise factors modulo N where R is the sum $r_{a_1} + \ldots + r_{a_l}$ of the random numbers $r_{a_1}, \ldots, r_{a_l}$ in the subset of l noise factors, such that $$s_{a_1} \cdot \ldots \cdot s_{a_l} \equiv h^{r_{a_1}} \cdot \ldots \cdot h^{r_{a_l}} \equiv h^{r_{a_1} + \ldots + r_{a_l}} \equiv h^R \bmod N,$$

encrypt the message m by computing a cipher text c as $$c = g^m \cdot h^R \bmod N$$

where g is a predefined integer parameter of the selected encryption scheme, and deliver the cipher text c as an encrypted message.

By employing the above method and encryption node, less time needs to be spent for computing the necessary noise factors after receiving the encryption request and higher throughput can thus be achieved for messages to be encrypted. In particular, the above method and encryption node may be used to increase the throughput for a stream of messages.

The above method and encryption node may be configured and implemented according to different optional embodiments to accomplish further features and benefits, to be described below.

A computer program storage product is also provided comprising instructions which, when executed on at least one processor in the encryption node, cause the at least one processor to carry out the method described above for the encryption node.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable more rapid encryption of messages to be processed, e.g., in a potentially unsafe or untrusted environment where privacy and integrity may be in jeopardy such as when a cloud of shared processing resources is used. In this solution, pre-computed noise factors are used for calculating a cipher text as encryption of an incoming message from a client, thereby achieving higher throughput of messages as compared to previous solutions, as will be described in more detail herein. The solution may be used for cryptosystems that basically use noise factors which are random powers of a fixed integer modulo another fixed integer, e.g. according to Scheme 3 of a Paillier cryptosystem. The computation of such noise factors is generally quite complex and time-consuming which normally limits the throughput of message encryption. In this solution, the computation of these noise factors is thus performed in advance and new noise factors for the encryption of a message can be produced in short time "on the fly" from the pre-computed noise factors, which thereby generally allows for higher throughput of messages with data.

The solution and its embodiments will be described in terms of functionality in an "encryption node" of a communication system, which can be seen as a logical node that could be arranged in one or more physical nodes and the solution is not limited to any particular implementation in practice. An example of how the solution may be employed will now be described with reference to the flow chart in FIG. 2 which illustrates a procedure with actions performed by an encryption node, to accomplish the advantages outlined above.

Figure 2:
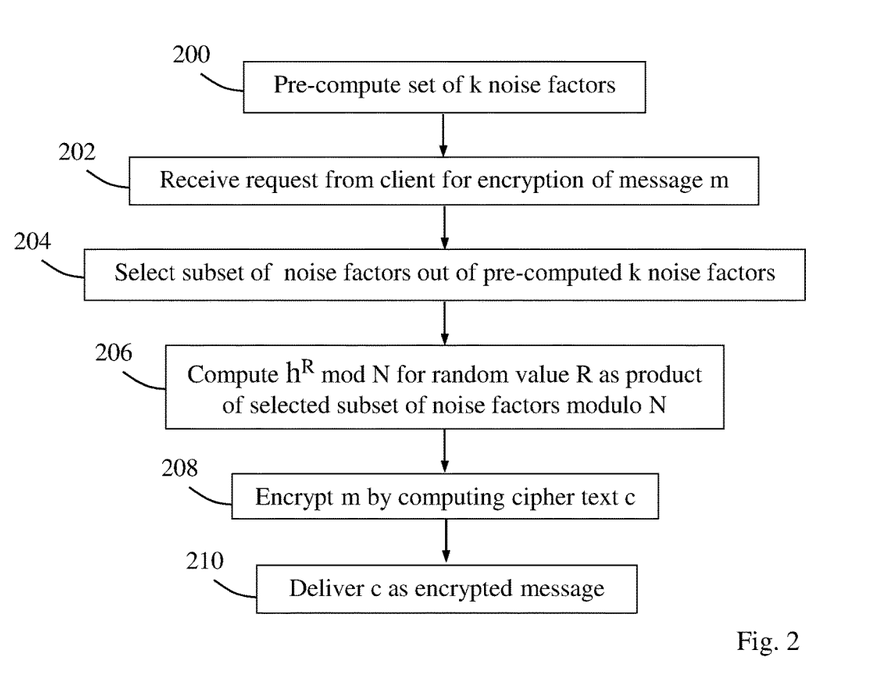
FIG. 2 is a flow chart illustrating a procedure in an encryption node, according to some possible embodiments.

The encryption node is operative to provide encryption of a message m according to a selected encryption scheme. For example, the message m may be received from a client that wishes to have it processed and/or analyzed in some manner where the message m needs to be protected from exposure, e.g. in a cloud environment or similar, such that it can be processed and/or analyzed in an encrypted form, although the solution is not limited to usage for cloud processing. The solution and its embodiments described herein are thus useful regardless of whether the message m is to be processed/analyzed in encrypted or decrypted form. The actual processing and/or analyzing of the message m is outside the scope of the solution and embodiments described herein.

Figure 3:
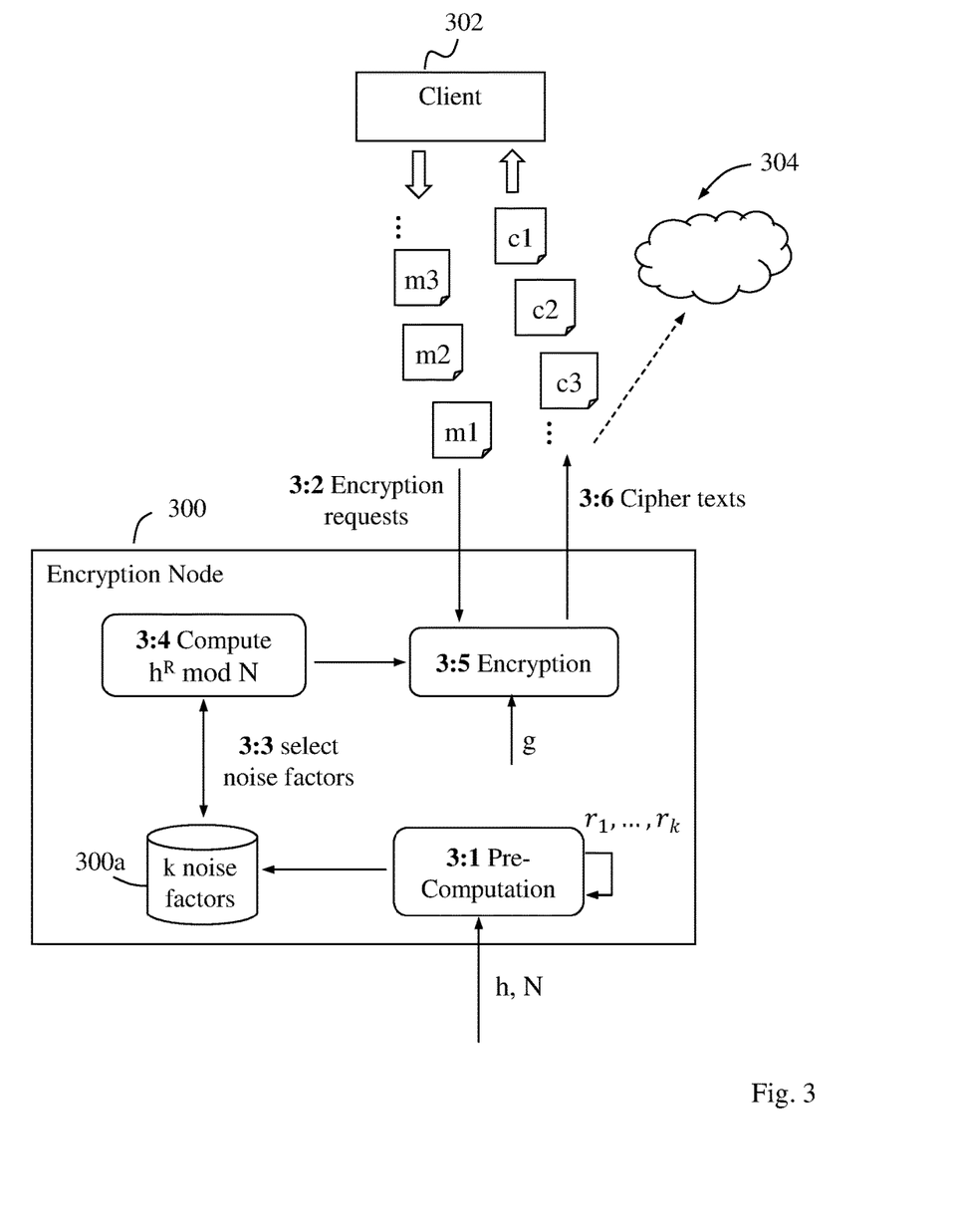
FIG. 3 is a communication scenario illustrating an example of how the solution may be employed by means of an encryption node, according to further possible embodiments.

Reference will also be made to FIG. 3 which illustrates an example of a communication scenario where the solution is employed involving the encryption node 300 and a client 302 which sends encryption requests for a series of messages $m_1, m_2, m_3, \ldots$ in the manner of a data stream. It may thus be of interest to achieve a high throughput in the encryption of such a data stream of messages, e.g. in terms of data rate, which can be accomplished by saving time when computing the noise factors which can be used in the encryption operation in the manner described below. It can thus be said that in this procedure, the pre-computation of noise factors is made "off-line" while the encryption of an incoming message m, e.g. as part of a data stream, is made in real-time. Although the examples and embodiments herein mainly refer to encryption of "a message", it can be understood that this procedure may be applied for each message of a stream or for any number of messages, e.g. repeatedly when messages to be encrypted are received in a data stream.

A first action 200 illustrates that the encryption node pre-computes a set of k noise factors which can be denoted $\{s_1, \ldots, s_k\}$. In this operation the k noise factors are pre-computed as $$s_1 = h^{r_1} \bmod N, \ldots, s_k = h^{r_k} \bmod N,$$

where h and N are predefined integer parameters of the selected encryption scheme and $r_1, \ldots, r_k$ are random numbers, while "mod" is short for the well-known mathematic operation called "modulo".

This pre-computation operation is also illustrated as an action 3:1 in FIG. 3 where h, N are used as predefined input parameters and the random numbers $r_1, \ldots, r_k$ are integers generated randomly by the encryption node. The predefined integer parameters h and N may be employed in the above-mentioned Scheme 3 of the Paillier cryptosystem which may thus be the selected encryption scheme to be used for the encryption in this procedure. In a possible embodiment, the predefined integer parameter N in the above pre-computation may be a composite number, i.e. a number that can be factorized into two or more integer factors being prime numbers. A composite number is thus not a prime number which cannot be factorized. This embodiment may be useful to increase security since if N would be a prime number instead, it is deemed easier to, e.g. illicitly, derive the message m from a given cipher text c.

FIG. 3 illustrates that the pre-computed set of k noise factors is saved in a suitable storage 300a for later use in the encryption of a message. The storage 300a may be arranged as part of the encryption node 300, as shown in FIG. 3, or as an external storage that can be accessed by the encryption node 300.

In a next action 202, the encryption node receives a request from the client for encryption of the message m, which is also illustrated as an action 3:2 in FIG. 3 where the encryption node 300 receives encryption requests for a series of messages $m_1, m_2, m_3, \ldots$ from the client 302 in the manner of a data stream. The procedure in FIG. 2 after action 200 is thus performed for each message and encryption request. In this context, receiving an "encryption request" may thus be implemented in practice as receiving a message m to be encrypted, not necessarily accompanied by an explicit request message or the like. In a possible embodiment, the encryption node may thus receive the message m from the client in a data stream. In this communication, any protocol may be used that is suitable for transferring a message to be encrypted, e.g. the hyper-text transfer protocol http or the file transfer protocol ftp over an IP (Internet Protocol) network.

Another action 204 illustrates that the encryption node selects a subset of l noise factors out of the pre-computed set of k noise factors, where the $1, \ldots, l$ noise factors can be denoted $s_{a_1}, \ldots, s_{a_l}$, respectively, which are to be used in the following encryption of the received message m. This selection of precomputed noise factors is also illustrated as an action 3:3 in FIG. 3 where the encryption node 300 acquires the selected subset of l noise factors from the storage 300a. In another possible embodiment, the encryption node may select the subset of l noise factors randomly from the pre-computed set of k noise factors, or they may alternatively be selected according to some predefined selection order or scheme and the solution is not limited in this respect.

The number of noise factors l selected in action 204 may be considerably lower than the total number of noise factors k precomputed in action 200. Thus, in another possible embodiment, the number of pre-computed noise factors k may be substantially high and the number of selected noise factors l may be substantially low, such that l«k. The random numbers in the selected noise factors $s_{a_1}, \ldots, s_{a_l}$ can be denoted as $r_{a_1}, \ldots, r_{a_l}$ respectively.

In a next action 206, the encryption node computes the expression $h^R \bmod N$ for a random value R as the product of the selected subset of l noise factors modulo N where R is the sum $r_{a_1} + \ldots + r_{a_l}$ of the random numbers $r_{a_1}, \ldots, r_{a_l}$ such that $$s_{a_1} \cdot \ldots \cdot s_{a_l} \equiv h^{r_{a_1}} \cdot \ldots \cdot h^{r_{a_l}} \equiv h^{r_{a_1} + \ldots + r_{a_l}} \equiv h^R \bmod N.$$

This computing operation is also illustrated in FIG. 3 by action 3:4 which indicates computation of $h^R \bmod N$ accordingly. The expression $h^R$ mod N will be used as a noise factor in the following operation of encrypting the message m. The expression $h^R$ mod N is thus a "total" noise factor which is created from the selected subset of l noise factors, and it will be used for encrypting this particular message as requested in action 202. It should be noted that for the next received message, e.g. message $m_2$ received after message $m_1$, new pre-computed noise factors are selected and a new total noise factor is generated as described above and used for encrypting the next message, e.g. $m_2$, such that each new incoming message is encrypted by a newly computed total noise factor.

A further action 208 illustrates that the encryption node encrypts the message m by computing a cipher text "c" as $$c = g^m \cdot h^R \bmod N$$

where g is a predefined integer parameter of the selected encryption scheme. Hence, the cipher text c is determined by multiplying the total noise factor $h^R$ mod N computed in action 206 with the predefined integer parameter g to the power of the message m, modulo N. The total noise factor $h^R$ mod N is thereby used for effectively hiding or "masking" the message m. This is also illustrated in FIG. 3 by action 3:5 which indicates encryption of each incoming message $m_1$, $m_2$, $m_3$, . . . accordingly.

A final shown action 210 illustrates that the encryption node eventually delivers the cipher text c as an encrypted message, either to the client or directly to a cloud of processing resources 304 depending on the implementation. In this communication, any protocol may be used that is suitable for transferring a cipher text c, e.g. the hyper-text transfer protocol http or the file transfer protocol ftp over an IP (Internet Protocol) network. This is also illustrated in FIG. 3 by action 3:6 which indicates that a series of cipher texts $c_1$, $c_2$, $c_3$, . . . may be returned to the client in response to the series of messages $m_1$, $m_2$, $m_3$, . . . received from the client 302, hence in the manner of a data stream. A dashed arrow in FIG. 3 indicates that the encryption node 300 may alternatively deliver the messages $m_1$, $m_2$, $m_3$, . . . directly to the cloud of processing resources 304. Thus for each incoming message $m_1$, $m_2$, $m_3$, . . . , actions 202-210 and 3:2-3:6, respectively, can be repeated in the manner described above, while action 200 and 3:1, respectively, only needs to be performed once as a "preparation step" in beforehand.

Further possible embodiments of the above-described procedure will be outlined and explained below. In one possible embodiment, the predefined integer parameter g may be an element in the multiplicative group $Z^*_N$, which embodiment is useful to allow or facilitate later decryption of the cipher text. The multiplicative group $Z^*_N$ is a well-known mathematic object which can be employed e.g. in the fields of cryptography, group theory and other computation areas. The multiplicative group $Z^*_N$ includes the numbers from 1 to N-1 whose greatest common divisor with N is 1.

In another possible embodiment, the predefined integer parameter h is a power of g in the multiplicative group $Z^*_N$ and the order of h is larger than 1 and smaller than $\varphi(N)$ where $\varphi$ is Euler's phi-function which is also well-known in the fields of cryptography, group theory and other computation areas. Briefly described, $\varphi(N)$ is the number of elements in $Z^*_N$, i.e., the number of numbers from 1 to N-1 whose greatest common divisor with N is 1.

In further possible embodiments, the selected encryption scheme may correspond to Scheme 3 of a Paillier cryptosystem, wherein the following conditions are applied:

The predefined integer parameter N is calculated as $N = p^2 \cdot q^2$ where p and q are prime numbers, the predefined integer parameter g is an element in the multiplicative group $Z^*_N$ and the order of g is a multiple of $p \cdot q$, and the predefined integer parameter h is calculated as $h = g^{p \cdot q} \bmod N$.

It will now be described in more detail how Scheme 3 of the Paillier cryptosystem may be used in the above procedure. Scheme 3 of the Paillier cryptosystem as such can be generally described as follows.

Parameters to be used in this procedure include private keys and public keys. As usual for asymmetric cryptography, anyone who knows the public keys can encrypt a message, but only those knowing the private keys can decrypt that message. The private keys include: two prime numbers p and q, and an integer a which is a positive divisor of $\lambda$ which in turn is the least common multiple of p-1 and q-1.

The public keys are $n = p \cdot q$, and an element g in $Z^*_{n^2}$ such that the order of g is $\alpha \cdot n$.

Encryption of the plaintext message m<n is accomplished by selecting a random number R<n and determining the cipher text c as $$c = g^m \cdot g^{n \cdot R} \bmod n^2$$

The factor $g^{n \cdot R}$ mod $n^2$ can be interpreted as the noise factor, hence the above-mentioned "total noise factor", that the expression $g^m$ mod $n^2$ is multiplied with. When the Paillier's cryptosystem is employed, $N = n^2$ and $h = g^n$ mod N.

For data encryption with Paillier's Scheme 3, a large number of modular multiplications are needed to compute the noise factor $g^{nR}$ mod $n^2$. In many practical applications, the message m will be much smaller than the random number R. Hence, a much larger number of modular multiplications is needed to compute the noise factor $g^{nR}$ mod $n^2$, compared to computing $g^m$ mod $n^2$. Computing $g^{nR}$ mod $n^2$ in real-time could thus become a bottleneck for applications requiring high throughput when encrypting a stream of data, such as the above-described data stream of messages $m_1$, $m_2$, $m_3$, . . . received from the client 302. By using selected precomputed noise factors to produce the "total" noise factor $g^{nR}$ mod $n^2$ according to the above-described procedure, this bottleneck can thus be avoided or at least reduced.

Using standard fixed basis exponentiation methods, the performance of computing the cipher text c can be improved by pre-computing powers of g and $h = g^n$ mod $n^2$. Thereby, the encryption is done by performing $\log_2 m + \log_2 R$ modular multiplications in the "worst" case, and by performing $\frac{1}{2}(\log_2 m + \log_2 R)$ modular multiplications in the average case.

The above-described solution and embodiments may be used to reduce the number of multiplications needed for data encryption with Paillier's Scheme 3, by pre-computing k random factors $g^{nr_1}, \ldots, g^{nr_k}$ mod $n^2$, (corresponding to actions 200, 3:1), selecting the subset of l noise factors for each encryption operation (corresponding to actions 204, 3:3), and computing $g^{nR}$ as the product mod $n^2$ of those l values (corresponding to actions 206, 3:4). This will reduce the number of multiplications for the noise part from $\frac{1}{2} \log_2 R$ in the average case to l−1. If k is sufficiently large then l can be quite small, and the number of multiplications for the noise part of calculations can be significantly reduced as $l - 1 \ll \frac{1}{2} \log_2 R$, thus, making the encryption operation much faster.

Specific Example

A particular example of how Scheme 3 of the Paillier cryptosystem can be used in an encryption node for the encryption of a message m will now be described.

In the pre-computation operation of actions 200, 3:1, k random values $g^{nr_1}, \ldots, g^{nr_k}$ mod $n^2$ are thus computed and stored. For each encryption, l of these values are chosen randomly as in actions 204, 3:3, and $g^{nR}$ is computed as the product of those l values as follows:

$$g^{nR} = \prod_{i=1}^{l} g^{nr_{a_i}} \bmod n^2 = (g^n)^{\sum_{i=1}^{l} r_{a_i}} \bmod n^2,$$

where $a_i \in [1 \ldots k]$, $i \in [1 \ldots l]$.

Thereby, the resulting noise is still of the form $g^{nR}$ as it is defined in the Paillier's Scheme 3, but this way the number of multiplications for computing $g^{nR}$ is reduced from ½ log$_2$R in the average case to l+1.

In order to increase the encryption performance, l should be much smaller than ½ log$_2$R. However, it may be necessary to ensure that the noise $g^{nR}$ is sufficiently random. This can be achieved by choosing a large value of k. The number of possible $g^{nR}$ is then $$\binom{k+l-1}{l}.$$

As a practical example, assuming that the random value R is approximately 512 bits long and the order of security parameter is desired to be in the range of $2^{80}$ for the noise $g^{nR}$, then the parameters k and l could be chosen as k~$2^{21}$, l~4.

This way, instead of requiring ½512−1=255 modular multiplications in average in the classical solution, it is necessary to make only 3 modular multiplications with the proposed solution.

General Example

A more generalized example of how the solution can be used in an encryption node for the encryption of a message m will now be described.

As outlined above, the solution can also be employed for generating any noise of the form $h^R$ mod N where h and N are predefined integer parameters and R is a random number. The parameters for the more general scheme are the integers g, h and N. For the special case of the Paillier cryptosystem, choose N to be $n^2$, h to be $g^n$ mod $n^2$ and g is as usual for the Paillier cryptosystem, i.e., g is an element of $Z^*_{n^2}$ whose order is a multiple of n. Encryption of a message m is performed by computing the cipher text c as c=$g^m h^R$ mod N, where R is a random number. The factor $h^R$ mod N is the noise factor in this more general form of c.

In the more general pre-computation operation of this example, k random values $s_1 = h^{r_1}$ mod N, $\ldots$, $s_k = h^{r_k}$ mod N are computed and stored. For each encryption, l of these values ($s_{a_1}, \ldots, s_{a_l}$) are selected, e.g. randomly, and $h^R$ mod N is computed as the product of those l values as follows:

$$h^R = \prod_{i=1}^{l} s_{a_i} \bmod N = \prod_{i=1}^{l} h^{r_{a_i}} \bmod N = h^{\sum_{i=1}^{l} r_{a_i}} \bmod N,$$

where $a_i \in [1 \ldots k]$, $i \in [1 \ldots l]$.

The resulting noise is still of the form $h^R$ mod N as described above, with R selected implicitly as R=$\sum_{i=1}^{l} r_{a_i}$, through the explicit selection of the values $s_{a_1}, \ldots, s_{a_l}$. The number of multiplications needed for this step is l−1.

So far it has just been assumed that the predefined parameters g, h and N are integers. However, some further conditions could be made for these parameters to make the encryption stronger. In order to make decryption a hard problem, it may be required that N should be a composite number, i.e. a non-prime number. It is also a reasonable condition to let the encryption take place in the multiplicative group $Z^*_N$, hence requiring that both g and h are elements of the group $Z^*_N$. Furthermore, in order to make the powers of h non-trivial residues modulo N, it may be assumed that the order of h should not be trivial, i.e., neither 1 nor φ(N), where φ is the Euler's phi-function. Equivalently, it may be assumed that the order of h should be larger than 1 and smaller than φ(N).

Figure 4:
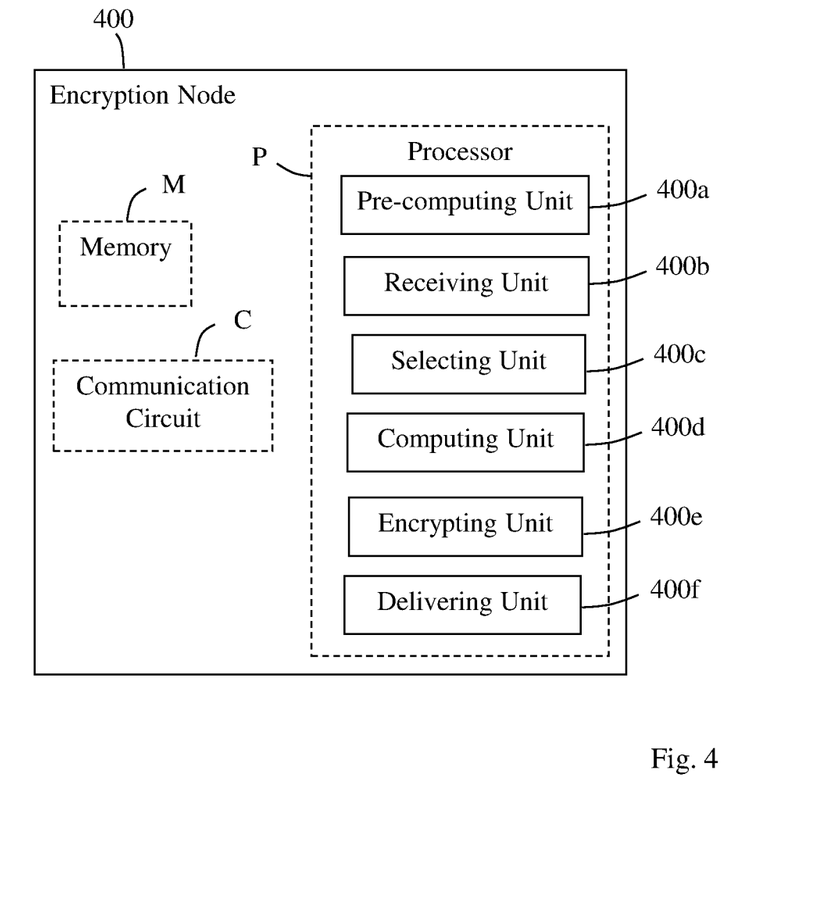
FIG. 4 is a block diagram illustrating an encryption node in more detail, according to further possible embodiments.

The block diagram in FIG. 4 illustrates a detailed but non-limiting example of how an encryption node 400 may be structured to bring about the above-described solution and embodiments thereof. In this figure, the encryption node 400 may thus be configured to operate according to any of the examples and embodiments of employing the solution as described above, where appropriate, and as follows. The encryption node 400 in this example is shown in a configuration that comprises a processor "P", a memory "M" and a communication circuit "C" with suitable equipment for receiving and transmitting information and data in the manner described herein.

The communication circuit C in the encryption node 400 thus comprises equipment configured for communication with at least a client, not shown, using one or more suitable communication protocols such as http or ftp, depending on implementation. As in the examples discussed above, the encryption node 400 may be configured or arranged to perform at least the actions of the procedures illustrated in FIG. 2 and FIG. 3 in the manner described above. These actions may be performed by means of functional units in the processor P in the encryption node 400 as follows.

The encryption node 400 is arranged to provide encryption of a message m in a communication system according to a selected encryption scheme. The encryption node 400 thus comprises the processor P and the memory M, said memory comprising instructions executable by said processor, whereby the encryption node 400 is operable as follows.

The encryption node 400 is configured to pre-compute a set of k noise factors $\{s_1, \ldots, s_k\}$ as $s_1 = h^{r_1}$ mod N, $\ldots$, $s_k = h^{r_k}$ mod N where h and N are predefined integer parameters of the selected encryption scheme and $r_1, \ldots, r_k$ are random numbers. This pre-computing operation may be performed by a pre-computing unit 400a in the encryption node 400, e.g. in the manner described for action 200 above. The encryption node 400 is also configured to receive a request from a client for encryption of the message m. This receiving operation may be performed by a receiving unit 400b in the encryption node 400, e.g. in the manner described for action 202 above.

The encryption node 400 is further configured to select a subset of l noise factors $s_{a_1}, \ldots, s_{a_l}$ out of the pre-computed set of k noise factors. This operation may be performed by a selecting unit 400c, e.g. in the manner described for action 204 above. The encryption node 400 is further configured to compute $h^R$ mod N for a random value R as the product of the selected subset of l noise factors modulo N where R is the sum $r_{a_1}+ \ldots +r_{a_l}$ of the random numbers $r_{a_1}, \ldots, r_{a_l}$ in the subset of l noise factors such that $$s_{a_1} \cdot \ldots \cdot s_{a_l} \equiv h^{r_{a_1}} \cdot \ldots \cdot h^{r_{a_l}} \equiv h^{r_{a_1}+ \ldots +r_{a_l}} \equiv h^R \mod N.$$

This operation may be performed by a computing unit 400d in the encryption node 400, e.g. in the manner described for action 206 above.

The encryption node 400 is further configured to encrypt the message m by computing a cipher text c as $$c = g^m \cdot h^R \mod N,$$

where g is a predefined integer parameter of the selected encryption scheme. This operation may be performed by an encrypting unit 400e, e.g. in the manner described for action 208 above. The encryption node 400 is further configured to deliver the cipher text c as an encrypted message, either to the client or to a cloud of processing resources. This operation may be performed by a delivering unit 400f in the encryption node 400, e.g. in the manner described for action 210 above.

It should be noted that FIG. 4 illustrates some possible functional units in the encryption node 400 and the skilled person is able to implement these functional units in practice using suitable software and hardware. Thus, the solution is generally not limited to the shown structure of the encryption node 400, and the functional units 400a-f may be configured to operate according to any of the features described in this disclosure, where appropriate.

The embodiments and features described herein may thus be implemented in a computer program storage product comprising instructions which, when executed on at least one processor, cause the at least one processor to carry out the above actions and functions e.g. as described for any of FIGS. 2 and 3. Some examples of how the computer program storage product can be realized in practice are outlined below, and with further reference to FIG. 4.

The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The memory M may comprise the above-mentioned computer readable storage medium or carrier on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM). The program modules could in alternative embodiments be distributed on different computer program products in the form of memories within the encryption node 400.

While the solution has been described with reference to specific exemplifying embodiments, the description is generally only intended to illustrate the inventive concept and should not be taken as limiting the scope of the solution. For example, the terms "encryption node", "message", "noise factor" and "cipher text" have been used throughout this disclosure, although any other corresponding entities, functions, and/or parameters could also be used having the features and characteristics described here. The solution is defined by the appended claims.

The invention claimed is:

1. A method performed by an encryption node of a communication system for providing encryption of a message m according to a selected encryption scheme, the method comprising:
   pre-computing a set of k noise factors $\{s\_1, \ldots, s\_k\}$ as $s\_1 = h^{\wedge}(r\_1) \mod N, \ldots, s\_k = h^{\wedge}(r\_k) \mod N,$ where k and N are predefined integer parameters of the selected encryption scheme and $r\_1, \ldots, r\_k$ are random numbers,
   receiving a request from a client for encryption of the message m,
   selecting a subset of l noise factors $s\_(a\_1), \ldots, s\_(a\_l)$ out of the pre-computed set of k noise factors,
   computing $h^{\wedge}R \mod N$ for a random value R as the product of the selected subset of l noise factors modulo N where R is the sum $r\_(a\_1)+ \ldots +r\_(a\_l)$ of the random numbers $r\_(a\_1), \ldots, r\_(a\_l)$ in the subset of l noise factors, such that $s\_(a\_1) \cdot \ldots \cdot s\_(a\_l) = h^{\wedge}(r\_(a\_1)) \cdot \ldots \cdot h^{\wedge}(r\_(a\_l)) = h^{\wedge}(r\_(a\_1) + \ldots + r\_(a\_l)) = h^{\wedge}R \mod N,$ encrypting the message m by computing a cipher text c as $c = g^{\wedge}m \cdot h^{\wedge}R \mod N$ where g is a predefined integer parameter of the selected encryption scheme, and delivering the cipher text c as an encrypted message.

2. The method of claim 1, wherein the encryption node receives the message m from the client in a data stream.

3. The method of claim 1, wherein the encryption node delivers the cipher text c to the client or to a cloud of processing resources.

4. The method of claim 1, wherein the predefined integer parameter N is a composite number.

5. The method of claim 1, wherein the predefined integer parameter g is an element in the multiplicative group $Z\_N^{\wedge}*$.

6. The method of claim 5, wherein the predefined integer parameter h is a power of g in the multiplicative group $Z\_N^{\wedge}*$ and the order of h is larger than 1 and smaller than $\varphi(N)$ where $\varphi$ is Euler's phi-function.

7. The method of claim 1, wherein the selected encryption scheme corresponds to Scheme 3 of a Paillier cryptosystem, and wherein $N = p^{\wedge}2 q^{\wedge}2$ where p and q are prime numbers,
   g is an element in the multiplicative group $Z\_N^{\wedge}*$ and the order of g is a multiple of p·q, and $h = g^{\wedge}(p \cdot q) \mod N.$ 8. The method of claim 1, wherein the encryption node selects the subset of l noise factors randomly from the pre-computed set of k noise factors.

9. The method of claim 1, wherein the number of pre-computed noise factors k is substantially high and the number of selected noise factors l is substantially low, such that l«k.

10. The method of claim 1, wherein at least one of receiving the request and delivering the cipher text c is performed using a hyper-text transfer protocol http or a file transfer protocol ftp.

11. An encryption node arranged to provide encryption of a message m in a communication system according to a selected encryption scheme, the encryption node comprising:

a processor; and a memory containing instructions executable by the processor, wherein the encryption node is configured to:

pre-compute a set of k noise factors $\{s\_1, \ldots, s\_k\}$ as $$s\_1 = h^{\wedge}(r\_1) \bmod N, \ldots, s\_k = h^{\wedge}(r\_k) \bmod N,$$

where h and N are predefined integer parameters of the selected encryption scheme and $r\_1, \ldots, r\_k$ are random numbers, receive a request from a client for encryption of the message m, select a subset of l noise factors $s\_(a\_1), \ldots, s\_(a\_l)$ out of the pre-computed set of k noise factors, compute $h^{\wedge}R \bmod N$ for a random value R as the product of the selected subset of l noise factors modulo N where R is the sum $r\_(a\_1) + \ldots + r\_(a\_l)$ of the random numbers $r\_(a\_1), \ldots, r\_(a\_l)$ in the subset of l noise factors, such that $$s\_(a\_1) \cdot \ldots \cdot s\_(a\_l) = h^{\wedge}(r\_(a\_1)) \cdot \ldots \cdot h^{\wedge}(r\_(a\_l)) = h^{\wedge}(r\_(a\_1) + \ldots + r\_(a\_l)) = h^{\wedge}R \bmod N,$$

encrypt the message m by computing a cipher text c as $$c = g^{\wedge}m \cdot h^{\wedge}R \bmod N$$

where g is a predefined integer parameter of the selected encryption scheme, and deliver the cipher text c as an encrypted message.

12. The encryption node of claim 11, wherein the encryption node is configured to receive the message m from the client in a data stream.

13. The encryption node of claim 11, wherein the encryption node is configured to deliver the cipher text c to the client or to a cloud of processing resources.

14. The encryption node of claim 11, wherein the predefined integer parameter N is a composite number.

15. The encryption node of claim 11, wherein the predefined integer parameter g is an element in the multiplicative group $Z\_N^{\wedge*}$.

16. The encryption node of claim 15, wherein the predefined integer parameter h is a power of g in the multiplicative group $Z\_N^{\wedge*}$ and the order of h is larger than 1 and smaller than $\varphi(N)$ where $\varphi$ is Euler's phi-function.

17. The encryption node of claim 11, wherein the selected encryption scheme corresponds to Scheme 3 of a Paillier cryptosystem, and wherein $N = p^{\wedge}2 \cdot q^{\wedge}2$ where p and q are prime numbers, g is an element in the multiplicative group $Z\_N^{\wedge*}$ and the order of g is a multiple of $p \cdot q$, and $$h = g^{\wedge}(p \cdot q) \bmod N.$$

18. The encryption node of claim 11, wherein the encryption node is configured to select the subset of l noise factors randomly from the pre-computed set of k noise factors.

19. The encryption node of claim 11, wherein the number of pre-computed noise factors k is substantially high and the number of selected noise factors l is substantially low, such that l«k.

20. The encryption node of claim 11, wherein the encryption node is configured to perform at least one of receiving the request and delivering the cipher text c using a hyper-text transfer protocol http or a file transfer protocol ftp.

21. A computer program product comprising a non-transitory computer readable medium comprising instructions which, when executed on at least one processor, cause the at least one processor perform a method for xxx, the method comprising:

pre-computing a set of k noise factors $\{s\_1, \ldots, s\_k\}$ as $$s\_1 = h^{\wedge}(r\_1) \bmod N, \ldots, s\_k = h^{\wedge}(r\_k) \bmod N,$$

where k and N are predefined integer parameters of the selected encryption scheme and $r\_1, \ldots, r\_k$ are random numbers, receiving a request from a client for encryption of the message m, selecting a subset of l noise factors $s\_(a\_1), \ldots, s\_(a\_l)$ out of the pre-computed set of k noise factors, computing $h^{\wedge}R \bmod N$ for a random value R as the product of the selected subset of l noise factors modulo N where R is the sum $r\_(a\_1) + \ldots + r\_(a\_l)$ of the random numbers) $r\_(a\_1), \ldots, r\_(a\_l)$ in the subset of l noise factors, such that $$s\_(a\_1) \cdot \ldots \cdot s\_(a\_l) = h^{\wedge}(r\_(a\_1)) \cdot \ldots \cdot h^{\wedge}(r\_(a\_l)) = h^{\wedge}(r\_(a\_1) + \ldots + r\_(a\_l)) = h^{\wedge}R \bmod N,$$

encrypting the message m by computing a cipher text c as $$c = g^{\wedge}m \cdot h^{\wedge}R \bmod N$$

where g is a predefined integer parameter of the selected encryption scheme, and delivering the cipher text c as an encrypted message.

* * * * *